April 23, 1940. E. S. CORNELL, JR 2,198,451
AIR-VENTING PIPE CONNECTION
Filed Aug. 27, 1937
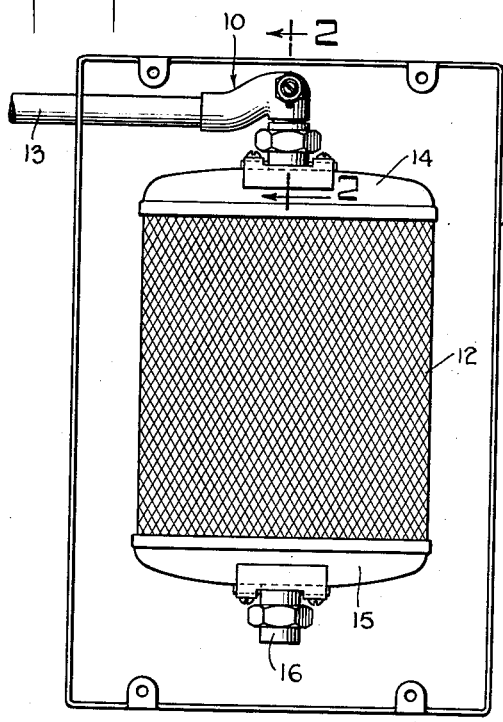
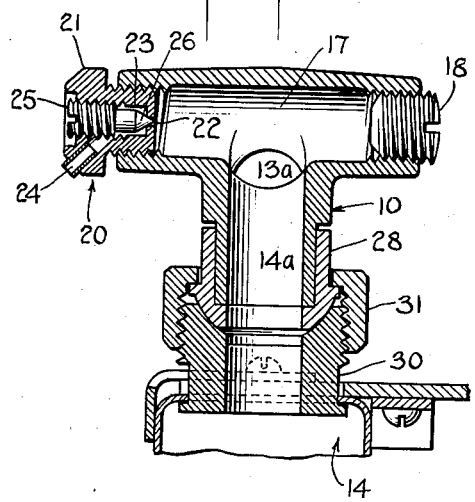
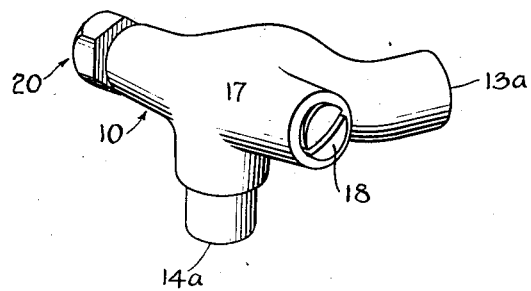
INVENTOR
Edward S. Cornell, Jr.
BY
Henry J. Lucke
HIS ATTORNEY Patented Apr. 23, 1940

2,198,451

UNITED STATES PATENT OFFICE 2,198,451

AIR-VENTING PIPE CONNECTION

Edward S. Cornell, Jr., Larchmont, N. Y., assignor, by mesne assignments, to American Radiator & Standard Sanitary Corporation, New York, N. Y., a corporation of Delaware Application August 27, 1937, Serial No. 161,225

2 Claims. (Cl. 137—69)

This invention relates to pipe fittings, and in particular to elbow fittings adaptable for joining a horizontal and an upward or downward run of pipe in a liquid-circulating system.

It is well known that in a pipe line circulating liquids containing dissolved or entrapped air or other gases, the gas, on separating out of the liquid, will collect at one or more high points in the piping system. A sufficient accumulation of gas "air binds" the system, with consequent impairment or complete stoppage of liquid circulation.

Particularly, such "air binding" occurs at points at which the run of pipe changes from horizontal to downward or upward direction. It is an object of this invention to provide an elbow arranged to make such transition in the direction of run of the pipe, which additionally has a gas-entrapping chamber or "high spot;" the chamber being provided with means whereby the gas entrapped therein may be conveniently removed.

In this invention, there is provided a pipe fitting of the nature of an elbow, having a chamber of substantial volume located preferably at the junction of, and communicating with, the inlet and outlet connections of the elbow to afford a free and unrestricted flow therethrough. An appreciable volume of the chamber is arranged to be located above the high point of the inlet and outlet connections, and thus the chamber forms a space in which entrapped or dissolved gas in the fluid may accumulate. Suitable valve means are provided to permit the removal of the gas.

In a pipe fitting of the class described, namely an elbow fitting, installation conditions may determine the direction of entry of the horizontal run of pipe into the said fitting. For example, a run of pipe may enter the fitting from the right or the left. Therefore, to make the gas-release valve means conveniently accessible regardless of the installed position of the fitting, I provide for alternate locations of the stated means. To that end, the gas-receiving chamber is advantageously disposed so as to have its longitudinal axis vertical to the plane of the inlet and outlet connections. By providing the stated chamber with tapped openings at its terminal ends, it is thus possible to close one of the openings with a plug or equivalent, and to insert the gas-release means in the other of the said openings. By making the plug and air-release valve interchangeable, it is obvious that the air-release valve may be located in the tapped opening more convenient to the user.

The stated chamber being of substantial volume and communicating with the flow-passage of the fitting, a free and unrestricted flow through the fitting is provided for. By advantageously locating the air-release means, the fitting may be kept flooded to a point above the top of its inlet and outlet passages, with resultant freedom of liquid circulation.

Other features and advantages will hereinafter appear.

In the accompanying drawing:

Fig. 1 is an elevation showing my air-release elbow serving as an air-venting radiator piping connection;

Fig. 2 is a vertical section of the elbow, taken along the lines of 2—2 of Fig. 1; and Fig. 3 is a perspective of the air-release elbow.

In Fig. 1, the air-release elbow 10 is illustrated, in a manner typical of its use, in connection with a heat exchange unit 11, of the type disclosed in my United States Letters Patent #2,038,347, granted April 21st, 1936 entitled "Air conditioned heating and cooling system," in which the circulation of fluid through a radiator 12 is utilized to accomplish the thermal treatment of air for circulation in a room or other enclosure. The thermal fluid, which may advantageously be heated or cooled water, may be drawn from a suitable riser or other part of the circulatory system by a pipe-connection 13, and directed, through the agency of the elbow 10, downwardly into a header 14 of the stated radiator. It will be understood that an outflow header 15 and union fitting 16 serve as connection points for a return pipe (not shown).

It is to be noted that in such an installation a condition normally favorable for the entrapment of air at the point of connection with the inlet to the radiator 11, is created. To provide for the centralized accumulation of such air and its convenient release, the elbow connection 10 is arranged to provide a high spot at which the air or other gas may collect, and is additionally provided with adjustable valve means by which the air may conveniently be drawn to insure the satisfactory circulation of the thermal fluid through the radiator. To this end, there is provided a chamber 17, see Fig. 2, an appreciable volume of which is located above the highest point of the fluid inlet passage 13a and outlet passage 14a of the elbow. The chamber may advantageously be located at the junction point of the stated inlet and outlet passages. In the embodiment illustrated in Fig. 2, the chamber 17 is shown as extending through a portion of the fluid passage of the elbow. It will be understood, however, that the chamber may advantageously be located fully above the fluid passage, connection therewith being had by a suitable opening.

In practice, the pipe 13 or equivalent may approach the elbow 10 from the right or the left, such approach depending upon the installation conditions and thus being beyond the control of the installer. Further, to provide for the entrapment of gas under variant positions of installation, and to provide convenient accessibility of the air-chamber for air removal, chamber 17 is arranged horizontally, as shown in Figs. 2 and 3, and preferably at right angles to the plane of the inlet and outlet connections. As shown, the chamber 17 extends transversely beyond the limits of the inlet and outlet connections. Advantageously, the terminal ends of chamber 17 may be provided with tapped openings, as shown, said openings receiving either a suitable pipe-plug 18 or equivalent, or an air-release valve 20.

Air-release valve 20 may comprise a cylindrical, hex-headed plug 21, a central orifice 22 of which forms a passage between chamber 17 and a threaded air passage 23 into which extends an air-release channel 24. To seal the air-release valve 20 against the escape of fluid, and yet permit the convenient removal of entrapped air, there is provided a plug or compression valve-screw 25 threaded to cooperate with the female threading of passage 23. The preferably conical end 26 of screw 25 is arranged to seat tightly against the orifice 22.

The elbow 10 is illustrated as being adaptable for the making of sweat-jointed rather than screw-threaded connections with its associated pipes. To this end, the inlet end 13a of the elbow may be provided with an internally smooth walled extension, arranged to accommodate the insertion of the pipe connection 13, as illustrated in Fig. 1. The outlet connection 14a may similarly have a smoothly cylindrical extension, which may be arranged to telescope within a suitable union ball-member 28, to which it may be permanently connected by sweat-jointing. To complete the means of connecting the elbow with the stated header 14, there are provided a union seat 30 and the associated coupling nut 31. The radiator 12 is thus readily detachable from the elbow connection. To effect sweat-jointing, and to prevent rusting or corrosion, the elbow 10 is advantageously formed from copper or copper alloy.

It will be noted from Fig. 2 that air entrapped within chamber 17 of elbow 10 may be withdrawn down to the level of the orifice 22, by unscrewing the plug 25 to permit the passage of air through the orifice 22 and out through channel 24. As the elbow connection may therefore be maintained in "flooded" status to the level of the orifice 22, the free and normal circulation of fluid through inlet channel 13a and outlet channel 14a is assured.

It is a feature of the invention that as plug 18 and the air-release valve 20 are interchangeable, the latter may always be located at a point convenient to the user. In the illustration in Fig. 1, it obviously is more convenient to have the air-release means facing forwardly, so that one wishing to release the entrapped air from the fitting finds valve 20 conveniently accessible. By the proper interchange of the air-release valve 20 and the plug 18, the stated valve may be located in its desirable forward position regardless of whether the inlet piping 13 approaches the elbow from the left, as shown in Fig. 1, or from the right.

The illustration of the application of my invention in Fig. 1 contemplates its use as a heating system, in which heated water enters the radiator 12 from the top, and gradually loses its heat content as it passes downwardly through the radiator, the outflow from the radiator being at union fitting 16. In such an installation, the passage 13a is the inlet, and passage 14a is the outlet of the elbow. As the system illustrated in Fig. 1 may also be used for cooling, in which event cooled water is circulated through the radiator, the entry of the water to the radiator would be through union 16 and header 15. In such an instance, passage 14a would be the inlet, and passage 13a the outlet from the elbow. The foregoing references to "inlet" and "outlet" passages should be qualified in the light of the above. The function of chamber 17 in entrapping air or other gas would remain identical in either case. It is to be understood also, that my invention is not restricted to a radiator connection, but is useful in any piping installation where the change in the run of pipe from horizontal or equivalent to downward or upward direction leads to a condition favorable for entrapment of air or gas.

Whereas I have described my invention by reference to specific forms thereof, it will be understood that many changes and modifications may be made without departing from the spirit of the invention.

I claim:

1. In an elbow fitting for a liquid conducting system, means for entrapping gas emanating from the liquid and for removing said entrapped gas, comprising a substantially cylindrical chamber communicating with the inlet and outlet passages of said elbow fitting and positioned transversely of a plane passing through the longitudinal axes of said inlet and said outlet passages, said chamber extending in substantial volume beyond an inner peripheral wall of each of said passages and having a substantial volume above the level of the uppermost wall of the inlet passage of said fitting at the terminal end thereof, and gas-release means operatively associated with said gas-entrapment chamber at a terminal end thereof and so disposed that liquid within said chamber may be established at a level affording substantially unrestricted flow through said elbow fitting.

2. In an elbow fitting for a liquid conducting system, means for entrapping gas emanating from the liquid and for removing said entrapped gas, comprising a substantially cylindrical chamber communicating with the inlet and outlet passages of said elbow fitting and passing transversely through a plane defined by the longitudinal axes of said inlet and said outlet passages, said chamber extending in substantial volume beyond diametrically opposite peripheral walls of said passages and having a substantial volume above the level of the uppermost wall of the inlet passage of said fitting at the terminal end thereof, and gas-release means arranged for operative association with either of said gas-entrapment cylinder extensions and so disposed that liquid within said chamber may be established at a level affording substantially unrestricted flow through said elbow fitting.

EDWARD S. CORNELL, Jr.